US008612875B2

(12) United States Patent
Bombolowsky et al.

(10) Patent No.: US 8,612,875 B2
(45) Date of Patent: *Dec. 17, 2013

(54) GRAPHICAL USER INTERFACE FOR DISPLAYING OBJECTS

(75) Inventors: Jens Bombolowsky, Schwetzingen (DE); Sabine Finke, Karlsruhe (DE)

(73) Assignee: SAP AG, Walldorf (DE)

( * ) Notice: Subject to any disclaimer, the term of this patent is extended or adjusted under 35 U.S.C. 154(b) by 666 days.

This patent is subject to a terminal disclaimer.

(21) Appl. No.: 12/786,292

(22) Filed: May 24, 2010

(65) Prior Publication Data

US 2010/0235790 A1 Sep. 16, 2010

Related U.S. Application Data

(63) Continuation of application No. 12/266,345, filed on Nov. 6, 2008, now Pat. No. 7,752,565.

(51) Int. Cl.
*G06F 3/048* (2013.01)

(52) U.S. Cl.
USPC ........... 715/766; 715/767; 715/782; 715/764; 715/781

(58) Field of Classification Search
USPC .......................... 715/766, 767, 782, 764, 781
See application file for complete search history.

(56) References Cited

U.S. PATENT DOCUMENTS

| | | | |
|---|---|---|---|
| 6,725,427 B2 | 4/2004 | Freeman et al. | |
| 6,768,999 B2 | 7/2004 | Prager et al. | |
| 2003/0074373 A1* | 4/2003 | Kaburagi et al. | 707/104.1 |
| 2005/0210410 A1 | 9/2005 | Ohwa et al. | |
| 2006/0265249 A1* | 11/2006 | Follis et al. | 705/3 |
| 2007/0070066 A1 | 3/2007 | Bakhash | |
| 2008/0066016 A1 | 3/2008 | Dowdy et al. | |
| 2008/0098311 A1 | 4/2008 | Delarue et al. | |

* cited by examiner

*Primary Examiner* — Ting Lee
(74) *Attorney, Agent, or Firm* — Mint, Levin, Cohn, Ferris, Glovsky and Popeo, P.C.

(57) ABSTRACT

First user-generated input is received that selects a first element in a graphical user interface identifying a work area. In response, a plurality of second elements characterizing categories of objects associated with the work area are displayed in the graphical user interface. Thereafter, second user-generated input is received that selects a second element in the graphical user interface element. Once the second element is selected, a visual representation of a plurality of primary objects associated with the category corresponding to the second element is displayed. The plurality of displayed primary objects are displayed in a first person perspective projection format with the objects being displayed in order at depths in the first person perspective projection according to values of an attribute associated with the second element. Related apparatus, systems, techniques and articles are also described.

20 Claims, 3 Drawing Sheets

GRAPHICAL USER INTERFACE FOR DISPLAYING OBJECTS

RELATED APPLICATION

This application is a continuation of U.S. patent application Ser. No. 12/266,345, filed on Nov. 6, 2008 now U.S. Pat. No. 7,752,565, entitled "Graphical User Interface for Displaying Objects," the contents of which are hereby fully incorporated by reference.

TECHNICAL FIELD

The subject matter described herein relates to interfaces for displaying a plurality of objects.

BACKGROUND

Object work lists can provide a user with a graphical representation of objects which can be accessed by a user. However, conventional techniques for presenting objects in an object work list are limited in the number of objects that can be simultaneously presented to a user. To access more objects than are displayed in a first view, users need to scroll or navigate in order to access objects not displayed in the first view. Moreover, it can be difficult for a user to decide which objects require immediate attention and, in cases of objects displayed in connection with personal work lists, it can be difficult for a user to decide which object first requires his or her attention.

SUMMARY

In one aspect, first user-generated input is received that selects a first element in a graphical user interface identifying a work area. In response, a plurality of second elements characterizing categories of primary objects associated with the work area are displayed in the graphical user interface. Thereafter, second user-generated input is received that selects a second element in the graphical user interface element. Once the second element is selected, a visual representation of a plurality of primary objects associated with the category corresponding to the second element is displayed. The plurality of displayed primary objects are displayed in a first person perspective projection format with the objects being displayed in order at depths in the first person perspective projection according to values of an attribute associated with the second element.

In some implementations, a first graphical user interface element associated with the depth dimension can be displayed so that when it is selected, the primary objects are arranged along the depth dimension in a reverse order as previously displayed.

The displayed primary objects can further be ordered along a horizontal dimension according to values of a second attribute. With such arrangements, a second graphical user interface element associated with the horizontal dimension can be displayed, and such element, when selected, can cause the primary objects to be arranged along the horizontal dimension in a reverse order as previously displayed.

In some variations, a visual representation of a plurality of secondary objects associated with a category other than the category corresponding to the second element can be displayed concurrently with the primary objects. These secondary objects can also be displayed in the first person perspective projection format (although a center of such first person perspective projection format can be offset in relation to the primary objects).

When a primary object is selected, the size of such object can be increased in relation to the other objects or alternatively, a new window or other display can be rendered which provides more details about such selected object. For example, a graphical preview of the content encapsulated by such object may be visually represented, and selecting such object causes the preview content to be displayed with more detail. In addition, the perspective termination point may terminate at the selected object so that, for example, a depth dimension extends in one direction for attribute values prior to the selected object, and the depth dimension can extend in the opposite direction for attribute values after the selected object.

The objects can comprise any data that might be useful for an individual to access including, for example and without limitation, documents, web sites, data encapsulated within business objects, tasks, and the like.

Additional graphical user interface elements can be provided to enable a user to manipulate how the objects are presented. For example, a scroll bar can be provided that allows a user to define a range of attribute values (and thus the objects that are displayed).

In a first interrelated aspect, user-generated input initiating rendering of a graphical user interface displaying an object work list is received. Subsequently, the object work list is displayed in a first person perspective projection format with renderings of objects in the object work list being ordered along a depth dimension according to values of a first attribute and the renderings of the objects in the object work list being ordered along a horizontal dimension according to values of a second attribute so that a size of each object rendering is based on a relative position along the depth dimension.

A first graphical user interface element associated with the depth dimension can be displayed, which, when activated, causes the objects to be arranged along the depth dimension in a reverse order as previously displayed. A second graphical user interface element can be displayed that is associated with the horizontal dimension. When the second graphical user interface element is selected, the objects are arranged along the horizontal dimension in a reverse order as previously displayed.

In a further interrelated aspect, a plurality of primary objects are displayed in a first person perspective projection format with renderings of the primary objects being ordered along a depth dimension according to values of a first attribute. Thereafter, user-generated input is received that selects one of the primary objects such that the selected primary object has a first attribute with a first value, at least one of the primary objects have attribute values less than the first value and at least one of the primary objects have attribute values greater than the first value. After the selection of the primary object, the primary objects excluding the selected object that have attribute values either greater or lesser than the first attribute value are displayed, a size of the selected object is enlarged, and the remaining primary objects excluding the selected object are displayed in a first person perspective diminishing projection format.

Articles are also described that comprise a machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current subject matter can be utilized to provide a graphical object work list in which objects are presented in a graphical representation that greatly condenses their size so that many objects can be simultaneously displayed (and thus be made accessible) to a user. In addition, the current subject matter can provide a user an enhanced understanding about a total number of objects in relation to their importance such that objects of greater importance or more prominently displayed in relation to other objects. In addition, a distance between objects can be related to importance level providing a user with additional relevant information relating to the objects.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
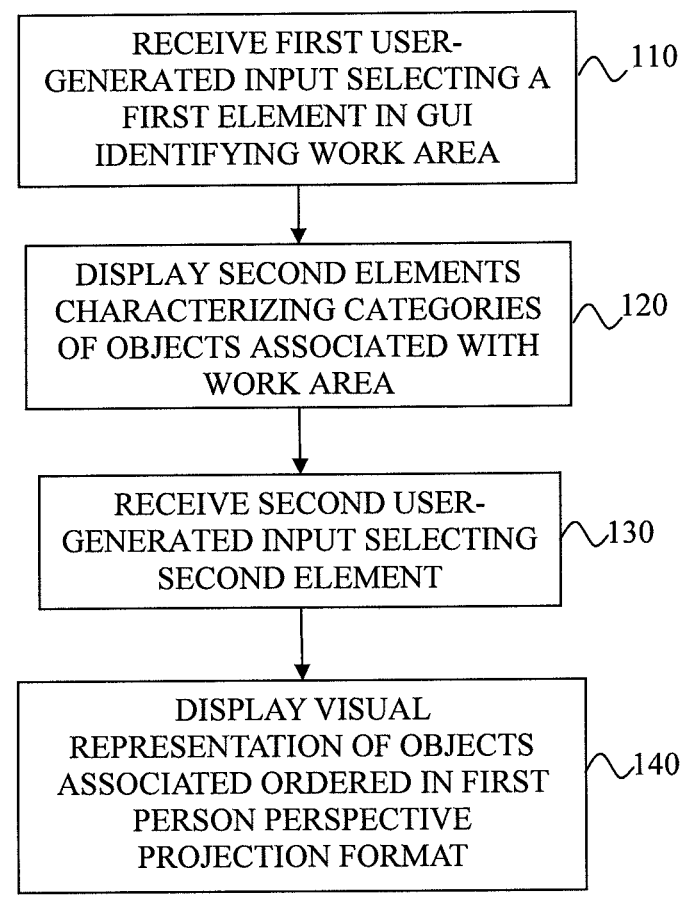
FIG. 1 is a process flow diagram illustrating a display of a plurality of objects in a graphical user interface.

FIG. 1 is a process flow diagram 100, in which, at 110, first user-generated input is received that selects a first element in a graphical user interface identifying a work area. In response, at 120, a plurality of second elements characterizing categories of primary objects associated with the work area are displayed in the graphical user interface. Thereafter, at 130, second user-generated input is received that selects a second element in the graphical user interface element. Once the second element is selected, at 140, a visual representation of a plurality of primary objects associated with the category corresponding to the second element is displayed. The plurality of displayed primary objects are displayed in a first person perspective projection format with the objects being displayed in order at depths in the first person perspective projection according to values of an attribute associated with the second element.

Figure 2:
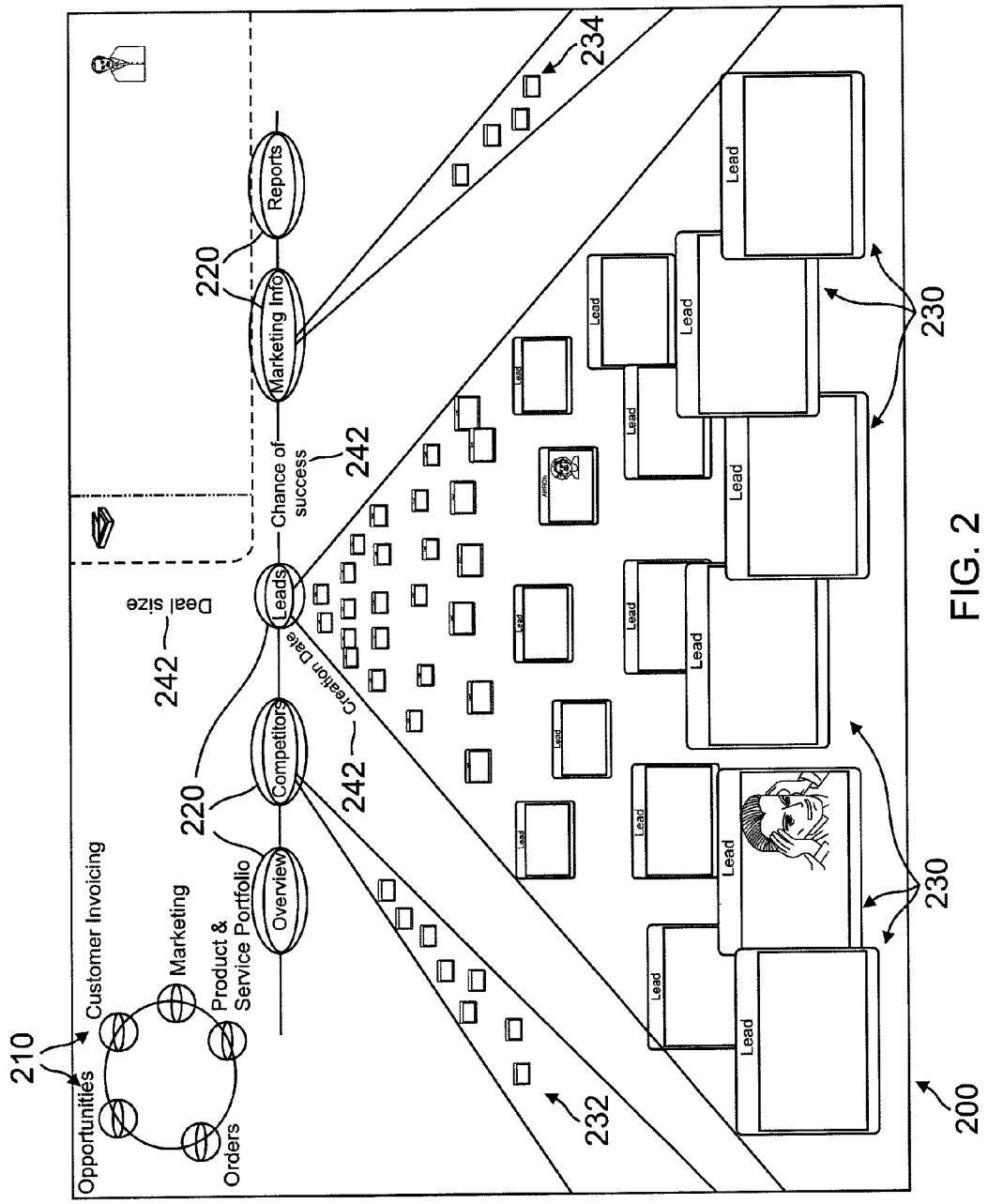
FIG. 2 is a first diagram illustrating a plurality of objects in a graphical user interface.

FIG. 2 is a diagram illustrating a graphical user interface 200 for presenting a plurality of objects to a user. While this example is directed to a graphical object work list, it will be appreciated that the interface can be used to visually display other types of objects (which can include documents, web pages, and the like). In operation, the user may select one of a plurality of work area elements 210 which correspond to various work areas in which the user is actively involved. In this example, the work area elements 210 correspond to Opportunities, Customer Invoicing, Marketing (which has been selected), Product & Service Portfolio, and Orders. In response to the selection of the work area element 210, a plurality of category elements 220 (e.g., Overview, Competitors, Leads, Marketing Information, Reports, etc.) can be displayed which relate to categories of objects that correspond to the selected work area element 210. Selection of one of the category elements 220 results in a graphical representation of a plurality of primary objects 230 corresponding to the selected category to be displayed. The graphical representation of a plurality of primary objects 230 can be displayed in a first person perspective projection format with the objects being displayed in order at depths in the first person perspective projection according to values of an attribute. Alternatively, selection of a work area element 210 can result in a default category element 220 being active and the resulting objects 230 being displayed.

In some implementations, attribute elements can be displayed 242, and the activation of such elements causes the order of the primary objects 230 to be reversed. Selection, by the user, of one of the plurality of primary objects 230 can cause a larger representation of such object to be displayed (either in the same window or in a separate window). In addition, selection of a different attribute element 242 can cause the primary objects 240 to be reordered according to such attribute along the depth dimension. In some variations, an attribute element 242 can be used to sort the primary objects 230 along a horizontal dimension. For example, if a depth dimension relates to creation date, a horizontal dimension could relate to deal size, or the like.

In order to illustrate a magnitude of objects available in other categories, secondary objects 232, 234 corresponding to different category elements 220 can be displayed in a first person projection format in an order defined by an attribute (with the first person projection being off-center or otherwise offset compared to the primary objects 230 in the center of the interface). Selection, at any time, of a different category element 220, will cause the corresponding primary objects 230 to be displayed generally in the center of the interface.

Figure 3:
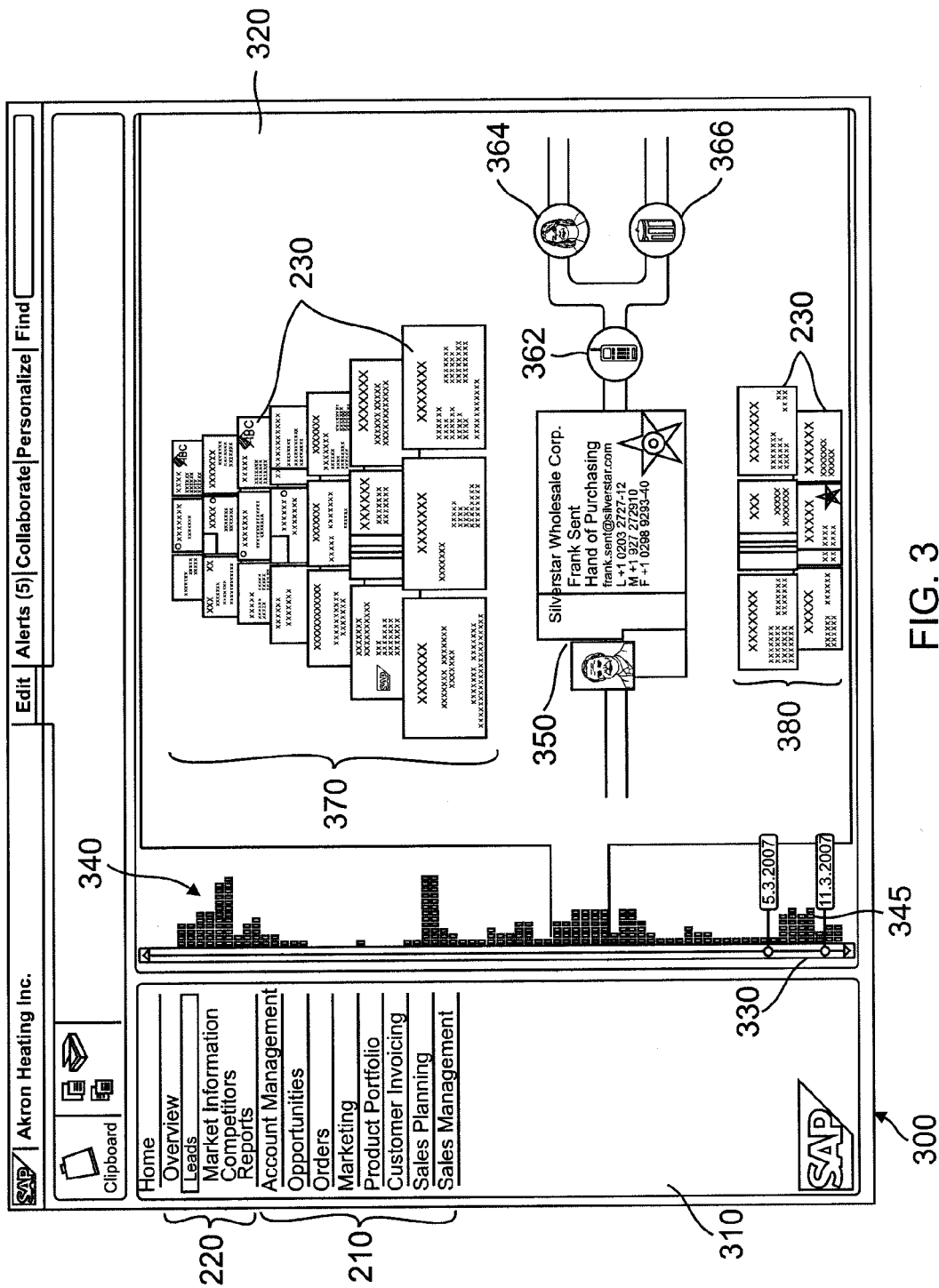
FIG. 3 is a second diagram illustrating a plurality of objects in a graphical user interface.

FIG. 3 is a diagram illustrating a graphical user interface 300 that is similar, in some aspects, to the graphical user interface 200 of FIG. 2. With this interface 300, elements 210 corresponding to the work areas can be displayed on a left side of a window in a menu portion 310 of the interface, and selection of one of such graphical user interface elements 210, results in primary objects 230 associated with the corresponding work area to be displayed in a display pad portion 320 of the interface. The menu portion 310 can be separate or overlap with the display pad portion 320. In some variations, the menu portion 310 can be a pop-up menu which may be minimized under certain circumstances so that the size of the display pad portion 320 can be maximized. A vertical dimension can have a corresponding scroll bar 330 that can allow a user to make changes to a range of attributes that correspond to displayed primary objects 230 in the display pad portion 320. In the example of FIG. 3, a user has adjusted the scroll bar 330 so that only primary objects 230 (in this case scans of business cards) having a creation date between Mar. 5, 2007 and Mar. 11, 2007 are displayed. A horizontal dimension perpendicular to the scroll bar 330 includes counter elements 340 (e.g., rectangles, etc.) which identify how many objects correspond to each attribute value. In this example, a selected object 350 has been selected by a user and is displayed more prominently than the other primary objects 230. In addition, a counter element 345 that corresponds to the selected object 350 can be visualized in order to differentiate it from the other counter elements 340.

The selected object 350 can also have one or more associated action elements 360, the selection of which, causes related actions to be initiated. For example, selection of a telephone action element 362 can result in a collaboration channel such as a telephone call to be initiated to a contact associated with the selected object 350, selection of a supervisor element 364 can identify a supervisor for the contact, and a trash can action element 366 can delete the selected object 350.

It will also be noted that the primary objects 230 in the display pad portion 320 are arranged in an upper portion 370 in a first person perspective with primary objects having older creation date attributes being displayed as being more distant, while primary objects 230 in a lower portion 380, which have more recent creation date attributes than the selected object 350 being displayed in a first person diminishing perspective projection format (with the newest primary objects 230 being displayed as being the most distant with the oldest primary objects created after the selected object 350 being displayed as closest in perspective).

The objects can be represented in a variety of manners. For example and without limitations, the objects can be symbolized by squares or other geometric shapes so long as they can be sorted in a three dimensional field according to one or more important attributes. Through such a mechanism, a user can directly make decisions based on the physical appearance of objects. In cases where the current subject matter is used for a graphical object work list, a user can configure the graphical object work list so that attributes having the highest level of importance are most easily identified and accessed by a user. For example, more important attribute values can be used to render the corresponding objects larger than objects having less important attribute values. Distances between objects can be used to characterize a relative difference in the attribute values along the corresponding dimension (e.g., depth dimension and/or horizontal dimension, etc.)

In some cases, the interfaces can provide that no objects overlap. In other implementations, less important objects can be overlapped, or simply if there are a large number of objects, their representations can overlap.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage medium embodying instructions that when performed by one or more machines result in operations comprising:

receiving first user-generated input selecting one of a plurality of first elements in a graphical user interface, each first element identifying a different work area;

displaying, in response to the first user-generated input, a plurality of second elements characterizing categories of primary objects associated with the work area corresponding to the selected first element in the graphical user interface;

receiving second user-generated input selecting one of the second elements in the graphical user interface; and displaying, in response to the second user-generated input, a visual representation of a plurality of primary objects associated with the category corresponding to the selected second element, the plurality of displayed primary objects being displayed in a first person perspective projection format with the objects being displayed in order at depths along a depth dimension in the first person perspective projection format according to values of a first attribute associated with the second element;

wherein distances between the primary objects in the depth dimension have varying intervals that characterize a relative difference in the first attribute values along the depth dimension;

wherein the displayed primary objects are further ordered along a horizontal dimension according to values of a second attribute such that distances between the primary objects in the horizontal dimension have varying intervals that characterize a relative difference in the second attribute values along the horizontal dimension.

2. An article as in claim 1, wherein the tangible machine-readable storage medium further embodies instructions that when performed by one or more machines result in operations comprise:

displaying a first graphical user interface element associated with the depth dimension, wherein a single selection of the first graphical user interface element causes the primary objects to be arranged along the depth dimension in a reverse order as previously displayed.

3. An article as in claim 2, wherein the tangible machine-readable storage medium further embodies instructions that when performed by one or more machines result in operations comprise:

displaying a second graphical user interface element associated with the horizontal dimension, wherein a single selection of the second graphical user interface element causes the primary objects to be arranged along the horizontal dimension in a reverse order as previously displayed.

4. An article as in claim 1, wherein the tangible machine-readable storage medium further embodies instructions that when performed by one or more machines result in operations comprise:

displaying, concurrently with the primary objects, a visual representation of a plurality of secondary objects associated with a category other than the category corresponding to the second element.

5. An article as in claim 4, wherein the plurality of secondary objects are displayed in the first person perspective projection format.

6. An article as in claim 5, wherein the first person perspective projection format of the plurality of secondary objects is offset from the first person projection format of the plurality of primary objects.

7. An article as in claim 1, wherein the tangible machine-readable storage medium further embodies instructions that when performed by one or more machines result in operations comprise:

receiving user-generated input selecting one of the objects; and increasing a display size of the selected object.

8. An article as in claim 1, wherein each displayed object comprises a graphical preview of content encapsulated within such object.

9. An article as in claim 1, wherein the plurality of primary objects are documents.

10. An article as in claim 1, wherein the plurality of primary objects are web pages.

11. An article as in claim 1, wherein the plurality of primary objects characterize data encapsulated within a business object.

12. An article as in claim 1, wherein the tangible machine-readable storage medium further embodies instructions that when performed by one or more machines result in operations comprise:

receiving user-generated input selecting one of the primary objects; and displaying the plurality of primary objects so that a perspective termination point corresponds with the selected object so that the depth dimension extends in one direction for primary objects having first attribute values prior to the selected primary object, and the depth dimension extends in an opposite direction for primary objects having first attribute values after the selected object.

13. An article as in claim 1, wherein the tangible machine-readable storage medium further embodies instructions that when performed by one or more machines result in operations comprise:

displaying, adjacent to the plurality of primary objects, a graphical user interface element that allows a user to define a range of first attribute values.

14. An article as in claim 1, wherein the tangible machine-readable storage medium further embodies instructions that when performed by one or more machines result in operations comprise:

displaying, adjacent to the plurality of primary objects, counter elements that characterize a number of primary objects having the same attribute value.

15. An article as in claim 1, wherein the tangible machine-readable storage medium further embodies instructions that when performed by one or more machines result in operations comprise:

visually modifying a rendering of a counter element when a corresponding primary object is selected.

16. A method for implementation by one or more data processors comprising:

receiving, by at least one data processor, first user-generated input selecting one of a plurality of first elements in a graphical user interface, each first element identifying a different work area;

displaying, by at least one data processor in response to the first user-generated input, a plurality of second elements characterizing categories of primary objects associated with the work area corresponding to the selected first element in the graphical user interface;

receiving, by at least one data processor, second user-generated input selecting one of the second elements in the graphical user interface; and displaying, by at least one data processor, in response to the second user-generated input, an object work list in a first person perspective projection format with renderings of objects in the object work list being relatively positioned at varying intervals along a depth dimension according to relative values of a first attribute and the renderings of the objects in the object work list being relatively positioned along a horizontal dimension at varying intervals according to relative values of a second attribute, a size of each object rendering being based on a relative value of the corresponding first attribute.

17. A method as in claim 16, further comprising:

displaying, by at least one data processor, a first graphical user interface element associated with the depth dimension, wherein a single selection of the first graphical user interface element causes the objects to be arranged along the depth dimension in a reverse order as previously displayed.

18. A method as in claim 17, further comprising:

displaying, by at least one data processor, a second graphical user interface element associated with the horizontal dimension, wherein a single selection of the second graphical user interface element causes the objects to be arranged along the horizontal dimension in a reverse order as previously displayed.

19. An article comprising a tangible machine-readable storage medium embodying instructions that when performed by one or more machines result in operations comprising:

displaying, in a graphical user interface, (i) a plurality of primary objects in a first person perspective projection format with renderings of the primary objects being ordered along a depth dimension according to relative values of a first attribute, and (ii) a counters element portion adjacent to each depth at which a primary object is displayed that identifies how many primary objects have a same value for the first attribute;

receiving user-generated input selecting one of the primary objects, the selected primary object having a first attribute with a first value, at least one of the primary objects having attribute values less than the first value and at least one of the primary objects having attribute values greater than the first value; and displaying, in the first perspective projection format, the primary objects excluding the selected object that have attribute values either one of (i) greater or (ii) lesser than the first attribute value, enlarging a size of the selected object so that the enlarged object replaces the selected object, and displaying, the remaining primary objects excluding the selected object, in a first person perspective diminishing projection format.

20. An article comprising a non-transitory machine-readable storage medium embodying instructions that when performed by one or more machines result in operations comprising:

receiving first user-generated input selecting a first element in a graphical user interface identifying a work area;

displaying, in response to the first user-generated input, a plurality of second elements characterizing categories of primary objects associated with the work area in the graphical user interface;

receiving second user-generated input selecting a second element in the graphical user interface; and displaying a visual representation of a plurality of primary objects associated with the category corresponding to the second element, each primary object having a first attribute value and a second attribute value, each of the plurality of displayed primary objects being displayed in a first person perspective projection format with the objects being displayed in order at depths in the first person perspective projection according to values of their corresponding first attribute value, wherein displayed primary objects having the same first attribute value are displayed at the same depth and wherein there at least two displayed primary objects having the same first attribute value, wherein distances between the primary objects in the depth dimension have varying intervals that characterize a relative difference in the first attribute values along the depth dimension, wherein each of the displayed primary objects having the same first attribute value are further ordered along a horizontal dimension according to values of their corresponding second attribute value such that distances between the primary objects in the horizontal dimension have varying intervals that characterize a relative difference in the second attribute values along the horizontal dimension.

* * * * *